UNITED STATES PATENT OFFICE.

EDDIE LAMBERT AND WALTER E. MATHEWS, OF BALTIC, CONNECTICUT.

ENAMEL.

1,234,777.      Specification of Letters Patent.      Patented July 31, 1917.

No Drawing.      Application filed July 11, 1916. Serial No. 108,706.

*To all whom it may concern:*

Be it known that we, EDDIE LAMBERT and WALTER E. MATHEWS, citizens of the United States, residing at Baltic, in the county of New London and State of Connecticut, have invented certain new and useful Improvements in Enamels, of which the following is a specification.

This invention has as its object to provide a novel enamel composition and more specifically to provide a white enamel capable of general application and of such composition that it will possess a smooth finish and high luster when dry.

The enamel of the present invention consists of the following ingredients in about the proportions stated:

White dammar varnish, 3 qts.
Cottonseed oil, 1 qt.
White drier, ½ pt.
Blue vitriol, 1 tablespoonful suspended in two tablespoonfuls of spirits of turpentine.
White lead, 2 lbs. ground in linseed oil.
Zinc white, 2 lbs. ground in linseed oil.
Alum, ½ teaspoonful.
Prussian blue in intimate mixture with linseed oil, 12 drops.

The foregoing ingredients are mixed in the order named and the mixture is thoroughly stirred after which the enamel is ready for use.

Blue vitriol is employed in the composition for the purpose of rendering the oil content less perceptible; alum for the purpose of holding the mixture together; and Prussian blue to "cut" or soften the oil cast and render the finish white in color.

Having thus described the invention, what is claimed as new is:

1. An enamel including in its composition a varnish, a drier, a paint oil, blue vitriol, white lead, zinc white, alum, and Prussian blue, in approximately the proportions stated.

2. An enamel including in its composition white dammar varnish, cottonseed oil, white drier, blue vitriol, white lead, zinc white, alum, and Prussian blue in intimate mixture with linseed oil, in approximately the proportions stated.

3. An enamel including in its composition white dammar varnish 3 qts., cottonseed oil 1 qt., white drier ½ pt., blue vitriol 1 tablespoonful, white lead 2 lbs. ground in oil, zinc white 2 lbs. ground in oil, alum ½ teaspoonful, and twelve drops of Prussian blue in intimate mixture with linseed oil.

In testimony whereof we affix our signatures.

EDDIE LAMBERT. [L. S.]
WALTER E. MATHEWS. [L. S.]

Copies of this patent may be obtained for five cents each, by addressing the "Commissioner of Patents, Washington, D. C."